US012759642B2

(12) United States Patent
Yong et al.

(10) Patent No.: US 12,759,642 B2
(45) Date of Patent: Oct. 13, 2026

(54) BACK PANEL ASSEMBLY FOR A VEHICLE

(71) Applicants: HYUNDAI MOTOR COMPANY, Seoul (KR); KIA CORPORATION, Seoul (KR)

(72) Inventors: Jiae Yong, Hwaseong-si (KR); SungWoong Ha, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 201 days.

(21) Appl. No.: 18/900,091

(22) Filed: Sep. 27, 2024

(65) Prior Publication Data

US 2025/0196930 A1 Jun. 19, 2025

(30) Foreign Application Priority Data

Dec. 15, 2023 (KR) ........................ 10-2023-0183612

(51) Int. Cl.
*B62D 25/08* (2006.01)
*B62D 21/15* (2006.01)
*B62D 25/20* (2006.01)

(52) U.S. Cl.
CPC ......... *B62D 25/087* (2013.01); *B62D 21/152* (2013.01); *B62D 25/2027* (2013.01)

(58) Field of Classification Search
CPC . B62D 25/087; B62D 21/152; B62D 25/2027
See application file for complete search history.

(56) References Cited

U.S. PATENT DOCUMENTS

2025/0222986 A1* 7/2025 Mo ........................ B62D 25/08
2026/0152237 A1* 6/2026 Liu ...................... B62D 25/087

FOREIGN PATENT DOCUMENTS

CN 104290819 B * 1/2017 ............. B62D 25/06
CN 113525275 B * 3/2024 ............. B60R 19/24
JP 5846036 B2 * 1/2016

* cited by examiner

*Primary Examiner* — Faye M Fleming
(74) *Attorney, Agent, or Firm* — Lempia Summerfield Katz LLC

(57) ABSTRACT

A back panel assembly, which forms a lower part of a tailgate opening at a rear side of a vehicle body, includes: a rear floor lower member having one end attached to a rear floor panel disposed at the rear side of the vehicle body; a rear transverse member having one end coupled to an end of the rear floor lower member; a back panel covering the rear side of the vehicle body by extending in the transverse direction of the vehicle body while connecting other ends of the rear floor lower member and the other end of the rear transverse member to each other; and a variable member extending in the transverse direction of the vehicle body while connecting the rear transverse member and the back panel to each other to thus divide a space formed therebetween into two spaces.

9 Claims, 23 Drawing Sheets

BACK PANEL ASSEMBLY FOR A VEHICLE

CROSS-REFERENCE TO RELATED APPLICATION

This application claims priority to and the benefit of Korean Patent Application No. 10-2023-0183612 filed in the Korean Intellectual Property Office on Dec. 15, 2023, the entire contents of which are incorporated herein by reference.

BACKGROUND

(a) Technical Field

The present disclosure relates to a back panel assembly of a vehicle, and more particularly, to a back panel assembly installed at a rear bumper side where a center part of a vehicle tailgate is opened and closed.

(b) Description of the Related Art

In general, a vehicle may include a trunk space, which is a space for accommodating cargo. This trunk space may be partitioned from the outside through a back panel assembly which forms a rear part of the vehicle.

As shown in FIGS. 1-3, in a back panel assembly installed on a chassis frame 1 at a rear side of a vehicle (i.e., vehicle rear), a rear floor lower member 4 may be installed at a lower end part of a rear floor panel 2 in a center part of a vehicle tailgate, and a rear transverse member 3 may be coupled to and installed on the top of the rear floor lower member 4. A back panel may cover the coupled rear floor lower member 4 and the rear transverse member 3 from the vehicle rear.

This back panel assembly structure may form a center surface of the rear floor panel 2 that extends downward to implement a low step height for convenience of rear seat riders, and a low load height for loading and unloading cargo. To cope with this low floor, it is possible to secure additional space (e.g., to secure space S2 in addition to space S1), which may cause a large step difference a-b between the center part and side part of the rear floor panel 2, thus making it difficult to set a back cross section using an existing method. It is thus necessary to secure connectivity with the chassis frame 1 while reinforcing a strength of the back panel assembly structure.

In addition, the vehicle may use a chassis frame body type that requires a gap of 10 mm or more between the chassis frame 1 and the back panel assembly structure. However, as the center surface of the rear floor panel 2 is formed to extend downward, a space (portion 'A') for forming the back cross section on a side may become narrow, thus making it difficult to set up the same back cross section as that of an existing vehicle model.

Therefore, it is necessary to develop a back panel assembly structure advantageous for coping with a low floor, advantageous for scalability to a purpose built vehicle (PBV), and capable of meeting rear collision regulation and bumper test regulation standards.

SUMMARY

The present disclosure attempts to provide a back panel assembly structure of a vehicle capable of coping with a low floor by adding a variable member between the rear transverse member and back panel of the vehicle to thus form a variable two-box back cross-section structure.

According to an embodiment, a back panel assembly is provided, which forms a lower part of a tailgate opening at a rear side of a vehicle body, the assembly including: a rear floor lower member having one end attached to a rear floor panel disposed at the rear side of the vehicle body, and extending in a transverse direction of the vehicle body; a rear transverse member having one end coupled to an end of the rear floor lower member, and extending in the transverse direction of the vehicle body; a back panel covering the rear side of the vehicle body by extending in the transverse direction of the vehicle body while connecting other ends of the rear floor lower member and the other end of the rear transverse member to each other; and a variable member extending in the transverse direction of the vehicle body while connecting the rear transverse member and the back panel to each other to thus divide a space, formed by the rear floor lower member, the rear transverse member, and the back panel, into two spaces.

The rear floor panel may extend in a direction horizontal to the vehicle body, and the one end of the rear floor lower member and the one end of the rear transverse member may be coupled to an end of the rear floor panel.

A side surface of the variable member and a side surface of the rear transverse member may be connected to each other by a variable member connection center bulkhead.

A side surface of the variable member connection center bulkhead may be welded to the side surface of the variable member and the side surface of the rear transverse member.

A side surface of the rear transverse member and a side surface of the rear floor lower member may be connected to each other by a side bulkhead.

The front of a center part of the variable member may be spot-welded to a surface of the rear transverse member in the transverse direction of the vehicle body.

The rear of a center part of the variable member may be spot-welded to an inner surface of the back panel in the transverse direction of the vehicle body.

The position and quantity (i.e., numbers) of the variable member may be changed based on the specifications and shapes of the rear transverse member and the back panel.

The variable member may include an attachment part attached to the rear transverse member and the back panel, and an extension part bent and extending from the attachment part.

The back panel assembly of a vehicle according to an embodiment of the present disclosure may be advantageous for coping with a low floor and the scalability to the PBV by including the center surface of the rear floor panel that is formed (i.e., protrudes or extends) downward.

In addition, the back panel assembly may meet the rear collision regulation and bumper test regulation standards by improving its strength in such a way that the variable member is added between the rear transverse member and the back panel to thus form the two-box (i.e., two space) back cross section structure, and the vehicle side part and the variable member are connected to each other by the side bulkhead.

In addition, the back panel assembly may be easily and flexibly used in various vehicle models by changing the position and numbers of the variable member to be used based on the vehicle size and shape.

In addition, the back panel assembly may secure the additional strength at the narrow part of the side cross section by connecting the variable member and the center bulkhead to each other.

DETAILED DESCRIPTION OF THE EMBODIMENTS

Figure 1:
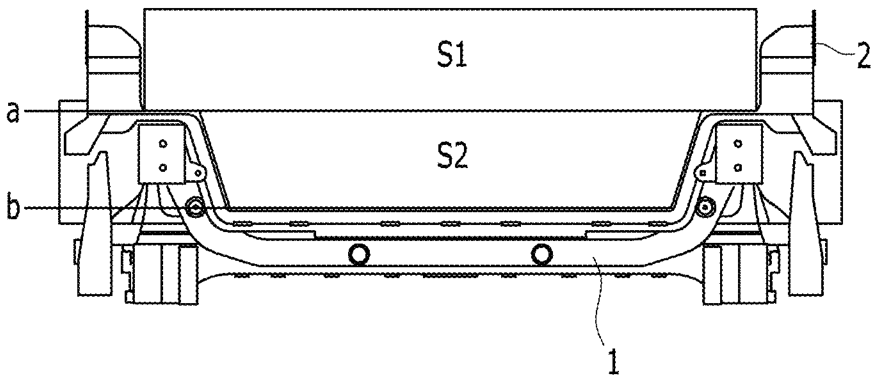
FIG. 1 (Prior Art)
FIG. 1 is a view schematically showing a vehicle loading space that uses a back panel assembly structure to cope with an existing low floor.
Figure 2:
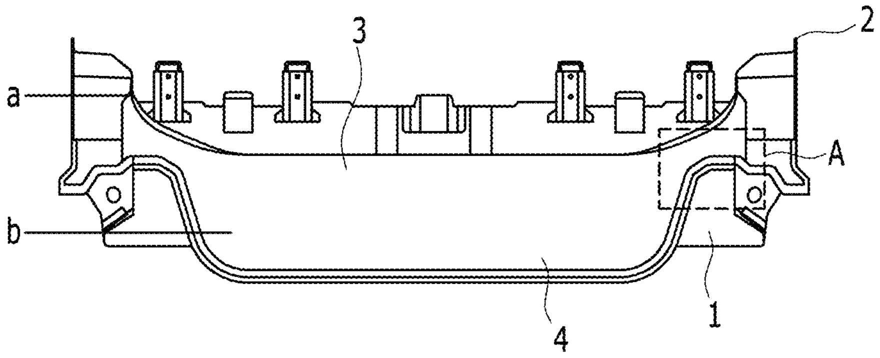
FIG. 2 (Prior Art)
FIG. 2 is a rear view showing a rear side of a vehicle that uses the back panel assembly structure to cope with the existing low floor.
Figure 3:
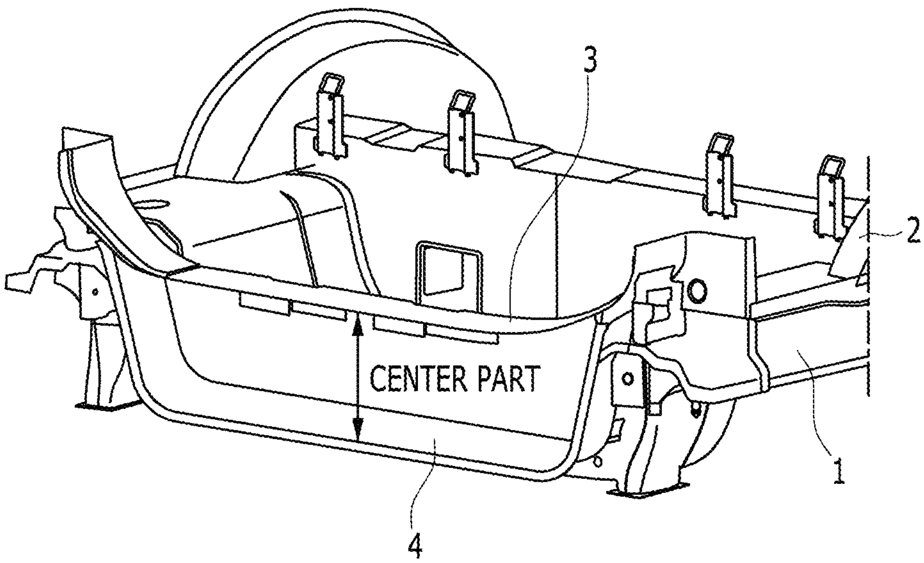
FIG. 3 (Prior Art)
FIG. 3 is a perspective view showing the rear side of the vehicle that uses the back panel assembly structure cope with the existing low floor.

Hereinafter, embodiments of the present disclosure are described in detail with reference to the accompanying drawings for those having ordinary skill in the art to which the present disclosure pertains to easily practice the present disclosure. The present disclosure may be modified in various different forms, and is not limited to the embodiments provided in the specification.

In addition, in various embodiments, components having the same configuration are representatively described using the same reference numerals in an embodiment, and only components different from those of an embodiment are described in the other embodiments. When a component, device, element, or the like of the present disclosure is described as having a purpose or performing an operation, function, or the like, the component, device, or element should be considered herein as being "configured to" meet that purpose or to perform that operation or function.

It should be understood that the drawings are schematic and not drawn to scale. The size and proportion of a component in the drawings are shown relatively exaggerated or reduced in size for clarity and convenience in the drawings. This arbitrary size is only illustrative and not limitative. In addition, the same reference numeral is used to denote a similar feature of the same structure, element, or part shown in two or more drawings. When it is described that an element is referred to as being "on" or "above" another element, it is to be understood that the element may be directly "on" another element or "above" another element having a third element interposed therebetween.

An embodiment of the present disclosure specifically represents one embodiment of the present disclosure. As a result, diagrams may be variously modified. Accordingly, an embodiment is not limited to a specific shape of the illustrated portion, and may include, for example, a shape modified when produced.

Hereinafter, a back panel assembly structure of a vehicle according to an embodiment of the present disclosure is described in detail with reference to the accompanying drawings.

Figure 4:
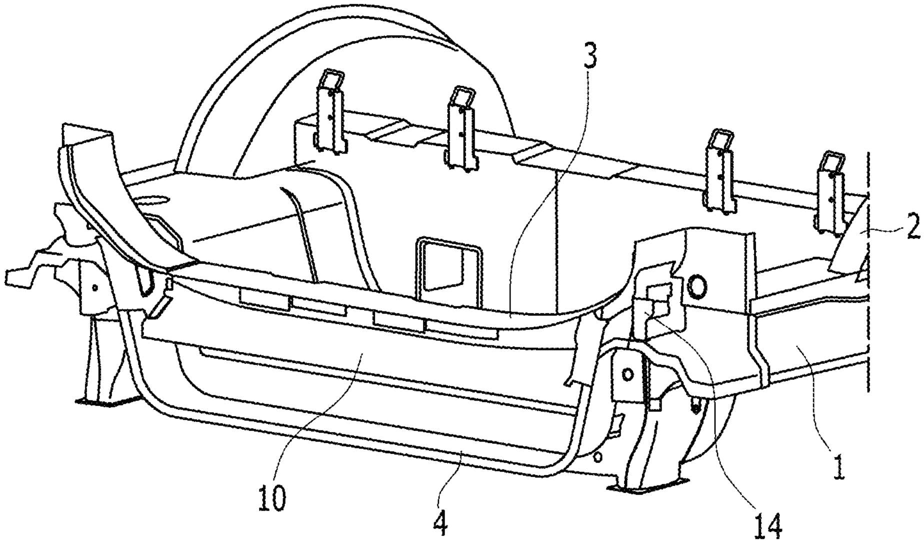
FIG. 4 is a perspective view showing the rear side of the vehicle that uses the back panel assembly structure according to an embodiment of the present disclosure.
Figure 5:
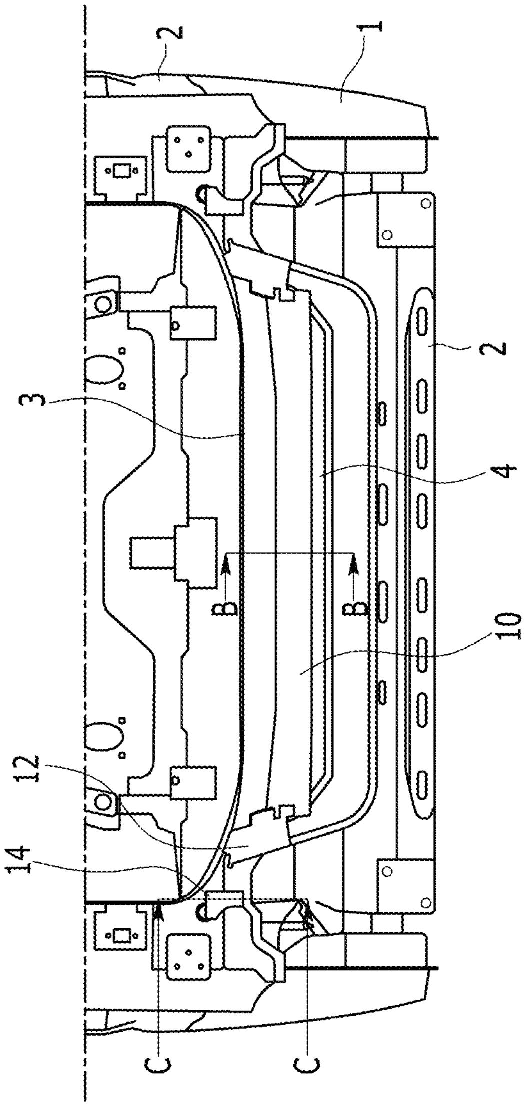
FIG. 5 is a rear view showing the rear side of the vehicle that uses the back panel assembly structure according to an embodiment of the present disclosure.
Figure 6:
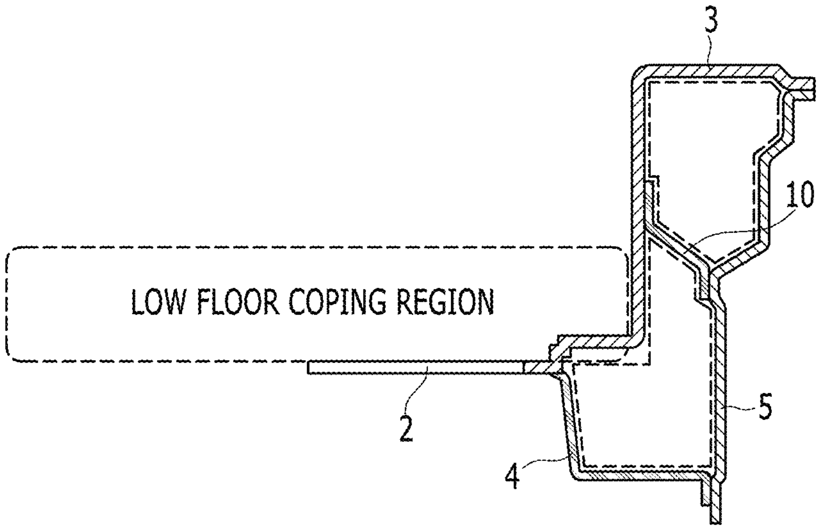
FIG. 6 is a cross-sectional view taken along line 'B-B' in FIG. 5.
Figure 7:
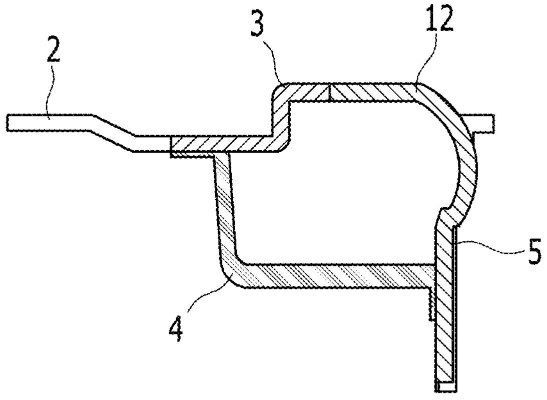
FIG. 7 is a cross-sectional view taken along line 'C-C' in FIG. 5.

FIG. 4 is a perspective view showing a rear side of a vehicle body (i.e., vehicle rear) that uses the back panel assembly structure according to an embodiment of the present disclosure. FIG. 5 is a rear view showing the rear side of the vehicle that uses the back panel assembly structure according to an embodiment of the present disclosure. FIG. 6 is a cross-sectional view taken along line 'B-B' in FIG. 5. FIG. 7 is a cross-sectional view taken along line 'C-C' in FIG. 5.

Referring to FIGS. 4-7, the back panel assembly of a vehicle according to an embodiment of the present disclosure may form a lower part of a tailgate opening at the vehicle rear. The back panel assembly includes a rear floor lower component, portion or member 4, a rear transverse component, portion or member 3, a back panel 5, and a variable component, portion or member 10.

A rear floor panel 2 may be disposed at the rear of a vehicle body 1, i.e., at an end of the vehicle body 1. The rear floor lower member 4 may be attached to an end of the rear floor panel 2. The rear floor lower member 4 may extend in a transverse direction of the vehicle body 1, and have a central portion seated at the end of the rear floor panel 2 and two side portions connected to the vehicle body 1. The rear floor lower member 4 may have its lower end protruding rearward from the vehicle body 1.

The rear transverse member 3 may be coupled to an end of the rear floor lower member 4 and extend in the transverse direction of the vehicle body 1. The rear transverse member 3 may have an upper end protruding rearward from the vehicle body 1 and a lower end protruding forward toward the vehicle body 1.

The back panel 5 may cover the rear of the vehicle body 1 by extending in the transverse direction of the vehicle body 1 while connecting the other end of the rear floor lower member 4 and the other end of the rear transverse member 3 to each other. The back panel 5 may be attached to the bottom of the upper end of the rear transverse member 3 and the front of the lower end of the rear floor lower member 4 (see FIG. 6).

The variable member 10 may extend in the transverse direction of the vehicle body 1 while connecting the rear transverse member 3 and the back panel 5 to each other. The variable member 10 may have two ends respectively attached to a surface of the rear transverse member 3 that faces the rear of the vehicle body 1 and a surface of the back panel 5 that faces the front of the vehicle body 1 to thus divide a space, formed by the rear floor lower member 4, the rear transverse member 3, and the back panel 5, into two (i.e., two spaces).

As shown in FIG. 6, in a central portion of the back panel assembly structure, the rear floor panel 2 may extend in a direction horizontal to the vehicle body 1, and one end of the rear floor lower member 4 and one end of the rear transverse member 3 may be welded to the end of the rear floor panel 2.

The rear floor panel 2 may be connected to one end of the rear transverse member 3 and one end of the rear floor lower member 4. A surface height of the rear floor panel 2, which is the connection point between the rear transverse member 3 and the rear floor lower member 4, may be lower than that of other vehicle models, which is advantageous for coping with a low floor.

The variable member 10 may include an attachment part attached to the rear transverse member 3 and the back panel 5, and an extension part bent and extending from the attachment part. The attachment part and the extension part may be bent to form an inclination, and the pair of attachment parts may extend in opposite directions along a height of the vehicle body 1. The pair of attachment parts may extend upward from (i.e., in relation to) the vehicle body 1 based on, or with respect to, the rear transverse member 3, and extend downward from (i.e., in relation to) the vehicle body 1 based on, or with respect to, the back panel 5.

The variable member 10 may function to divide the space formed by the rear floor lower member 4, the rear transverse member 3, and the back panel 5 into two. The variable member 10 may also support the rear transverse member 3 and the back panel 5 in the space, thereby improving a strength of the back panel assembly.

As shown in FIG. 7, in the side part of the back panel assembly structure, the back panel 5 may be attached to the bottom of the upper end of the rear transverse member 3 and the front of the lower end of the rear floor lower member 4. In addition, the back panel 5 may attached to the members 3, 4 to cover a variable member connection center bulkhead 12.

Figure 8:
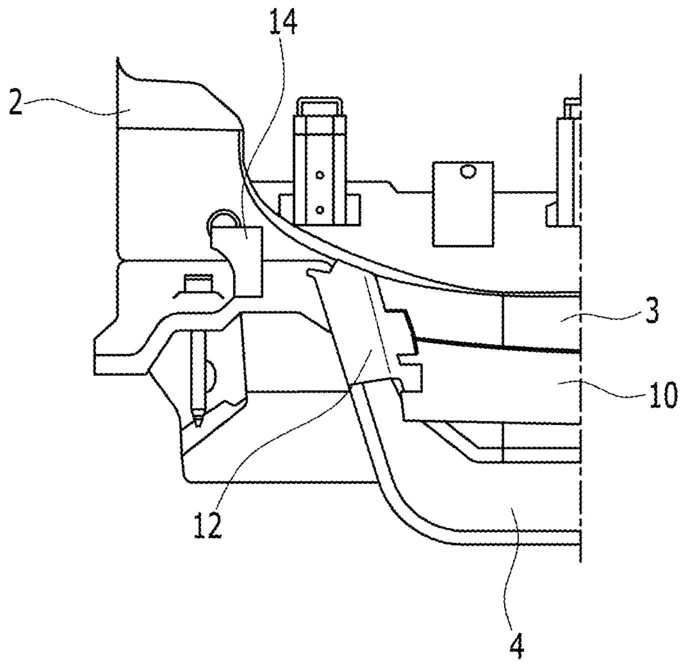
FIG. 8 is an enlarged view of a side part in the back panel assembly structure according to an embodiment of the present disclosure.

FIG. 8 is an enlarged view of the side part in the back panel assembly structure according to an embodiment of the present disclosure.

Referring to FIG. 8, a side surface of the variable member 10 and a side surface of the rear transverse member 3 may be connected to each other by the variable member connection center bulkhead 12. The variable member connection center bulkhead 12 may strengthen the coupling between the variable member 10 and the rear transverse member 3 and improve the strength of the back panel assembly.

In addition, a side surface of the rear transverse member 3 and a side surface of the rear floor lower member 4 may be connected to each other by a side bulkhead 14. The side bulkhead 14 may also strengthen the coupling between the rear transverse member 3 and the rear floor lower member 4 and improve the strength of the back panel assembly. As shown in FIG. 4, the side bulkheads 14 may respectively be disposed outward from the vehicle body 1 based on, or with respect to, the side surface of the rear transverse member 3 and the side surface of the rear floor lower member 4, and coupled to the corresponding members 3, 4.

Therefore, the variable member 10 and the rear transverse member 3 may be coupled and supported to each other inside a cross section closed by the variable member connection center bulkhead 12, and the rear transverse member 3 and the rear floor lower member 4 may be coupled and supported to each other outside a cross section closed by the side bulkhead 14. These connections and supports thus improve the strength of the back panel assembly, thereby contributing to the back panel assembly structure meeting rear collision regulation and bumper test regulation standards.

FIGS. 9-12 are views showing a coupling process of the rear transverse member, variable member, center bulkhead, side bulkhead, and back panel of the back panel assembly structure according to an embodiment of the present disclosure. FIG. 13 is a cross-sectional view taken along line 'D-D' in FIG. 12.

Figure 9:
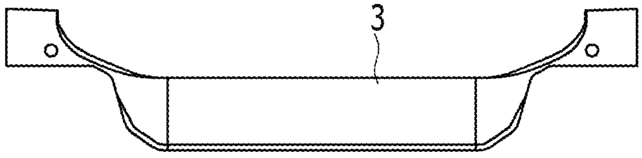
FIGS. 9-12 are views showing a coupling process of the rear transverse member, variable member, center bulkhead, side bulkhead, and back panel of the back panel assembly structure according to an embodiment of the present disclosure.
Figure 10:
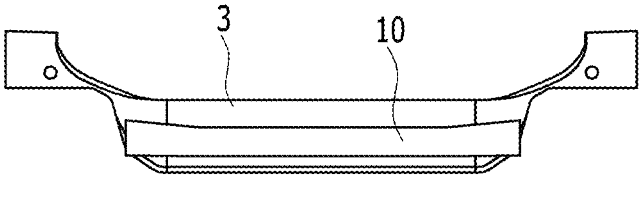

As shown in FIGS. 9 and 10, the variable member 10 may be attached and coupled to a central portion of the surface of the rear transverse member 3 that faces the rear of the vehicle body 1 in the transverse direction of the vehicle body.

Figure 11:
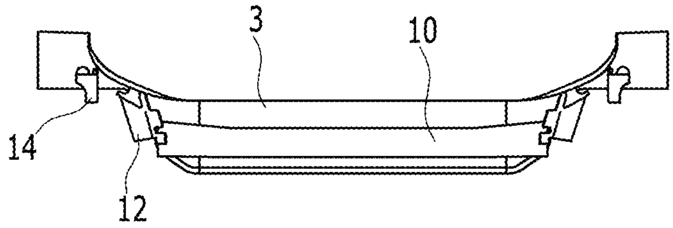

Next, as shown in FIG. 11, the side surface of the variable member 10 and the side surface of the rear transverse member 3 may be connected to each other by each of the pair of variable member connection center bulkheads 12, and the pair of side bulkheads 14 may be attached to the rear transverse member 3.

Figure 12:
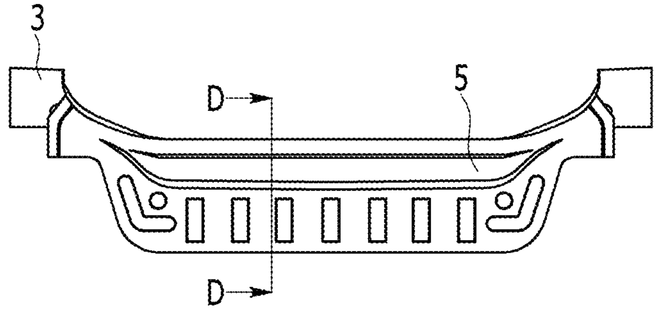
Figure 13:
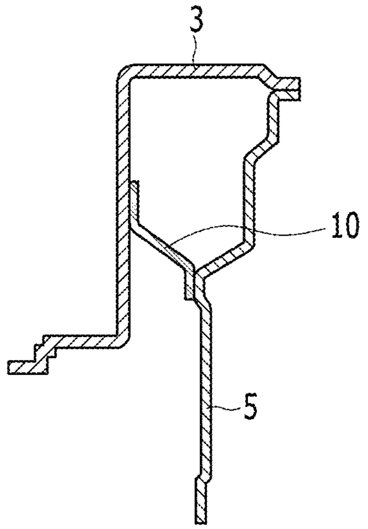
FIG. 13 is a cross-sectional view taken along line 'D-D' in FIG. 12.

Next, as shown in FIG. 12, the back panel 5 may be coupled to cover the assembled components. As shown in FIG. 13, an upper end of the back panel 5 may be attached to the bottom of the upper end of the rear transverse member 3, and a central portion of the back panel 5 may be attached to the attachment part of the variable member 10.

Figure 14:
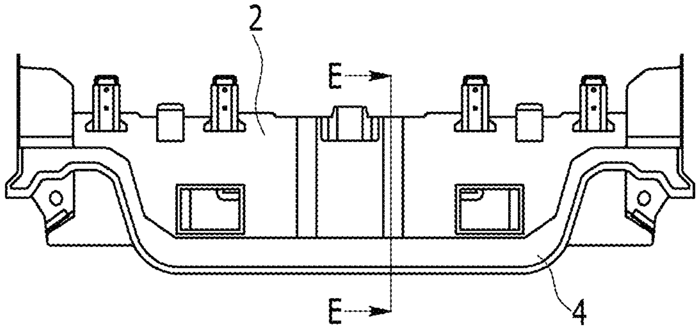
FIG. 14 is a view showing a state where the rear floor panel and rear floor lower member of the back panel assembly structure are coupled to each other according to an embodiment of the present disclosure.
Figure 15:
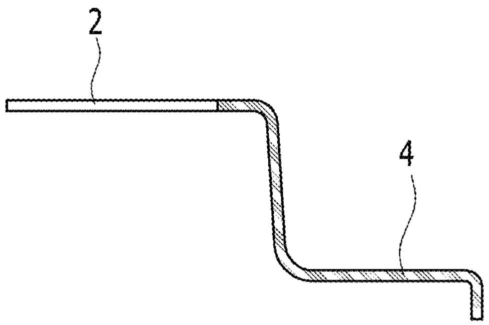
FIG. 15 is a cross-sectional view taken along line 'E-E' in FIG. 14.
Figure 16:
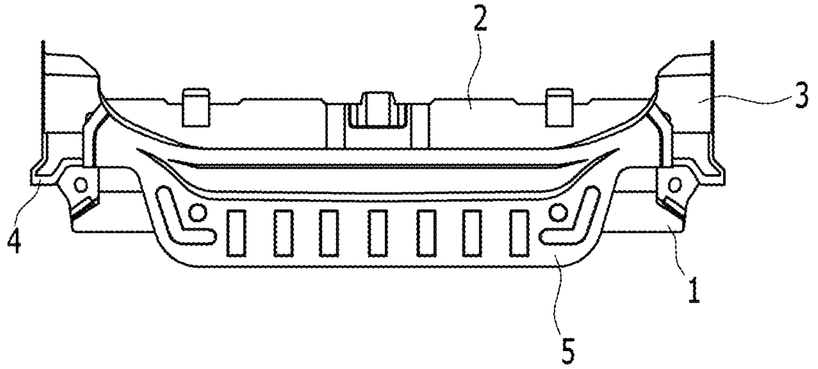
FIG. 16 is a view showing a state where the back panel assembly structure according to an embodiment of the present disclosure is completely assembled.

FIG. 14 is a view showing a state where the rear floor panel and rear floor lower member of the back panel assembly structure are coupled to each other according to an embodiment of the present disclosure. FIG. 15 is a cross-sectional view taken along line 'E-E' in FIG. 14. FIG. 16 is a view showing a state where the back panel assembly structure according to an embodiment of the present disclosure is completely assembled.

As shown in FIG. 14, the rear floor lower member 4 may be attached to the rear floor panel 2 disposed at the rear of the vehicle body 1 by extending in the transverse direction of the vehicle body 1. As shown in FIG. 15, one end of the rear floor lower member 4 may be connected to an end of a portion of the rear floor panel 2 that extends in the direction horizontal to the vehicle body 1.

As shown in FIG. 16, the components assembled in FIGS. 9-12 may be coupled to the components assembled in FIG. 14. One end of the rear transverse member 3 and one end of the rear floor lower member 4 may be connected to each other, and a lower inner surface of the back panel 5 may be attached to the other end of the rear floor lower member 4. In addition, the variable member 10 may be attached to the central portion of the back panel 5 to thus connect the rear transverse member 3 and the back panel 5 to each other, thereby forming a structure of dividing the space in-between into two. In addition, the side bulkhead 14 may connect the side surface of the rear transverse member 3 and the side surface of the rear floor lower member 4 to each other.

In this way, the back panel assembly according to an embodiment of the present disclosure may be completely assembled.

Figure 17:
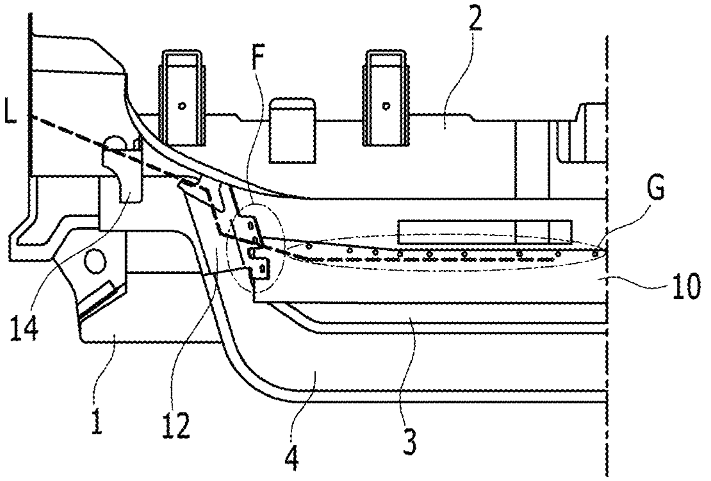
FIG. 17 is a view showing a load path of the back panel assembly structure and a welded portion between the rear transverse member and the variable member according to an embodiment of the present disclosure.

FIG. 17 is a view showing a load path of the back panel assembly structure and a welded portion between the rear transverse member and the variable member according to an embodiment of the present disclosure.

As shown in FIG. 17, a side surface of the variable member connection center bulkhead 12 may be welded to the side surface of the variable member 10 and the side surface of the rear transverse member 3 (portion 'F').

In addition, the front of the center part of the variable member 10 may be spot-welded to a surface of the rear transverse member 3 in the transverse direction of the vehicle body 1 (portion 'G').

An impact or a load (shown by dotted line L in FIG. 17), applied to the back panel assembly, may be distributed along the path established by a serial connection of the rear transverse member 3, the side bulkhead 14, the rear floor lower member 4, the variable member connection center bulkhead 12, and the variable member 10.

The rear of the center part of the variable member 10 may be spot-welded to an inner surface of the back panel 5 in the transverse direction of the vehicle body 1.

FIGS. 18-21 are views each showing an installation example of the variable member of the back panel assembly structure according to an embodiment of the present disclosure.

The position and numbers of the variable member 10 may be changed based on the specifications and shapes of the rear transverse member 3 and the back panel 5.

Figure 18:
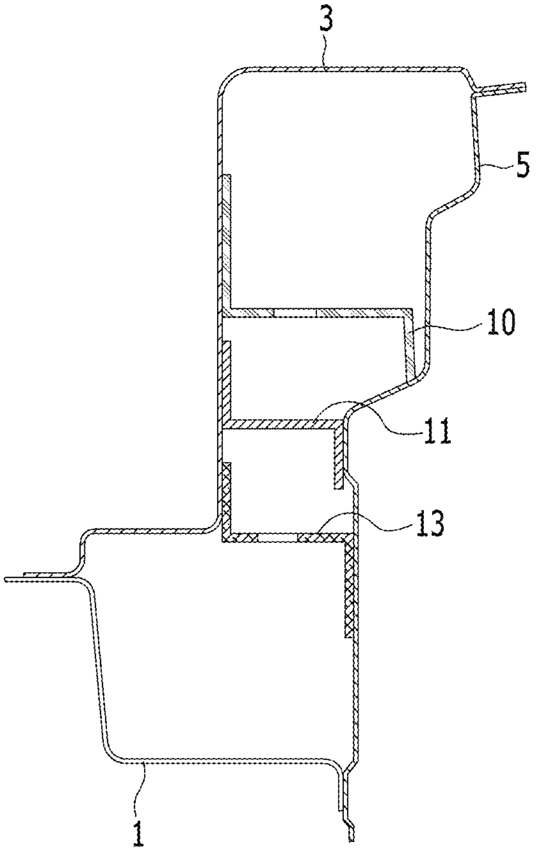
FIGS. 18-21 are views each showing an installation example of the variable member of the back panel assembly structure according to an embodiment of the present disclosure.

As shown in FIG. 18, three variable members 10, 11, and 13 may be disposed in a longitudinal direction of the vehicle body 1. The variable members 10, 11, or 13 may include an attachment part (or pair of attachment parts) attached to the rear transverse member 3 and the back panel 5, and an extension part bent and extending from the attachment part(s). The attachment part(s) and the extension part may be bent to form a right angle to each other.

In addition, the pair of attachment parts may extend in opposite directions along the height of the vehicle body 1. The pair of attachment parts may extend upward in relation to the vehicle body 1 based on, or with respect to, the rear transverse member 3, and extend downward in relation to the vehicle body 1 based on, or with respect to, the back panel 5.

Figure 19:
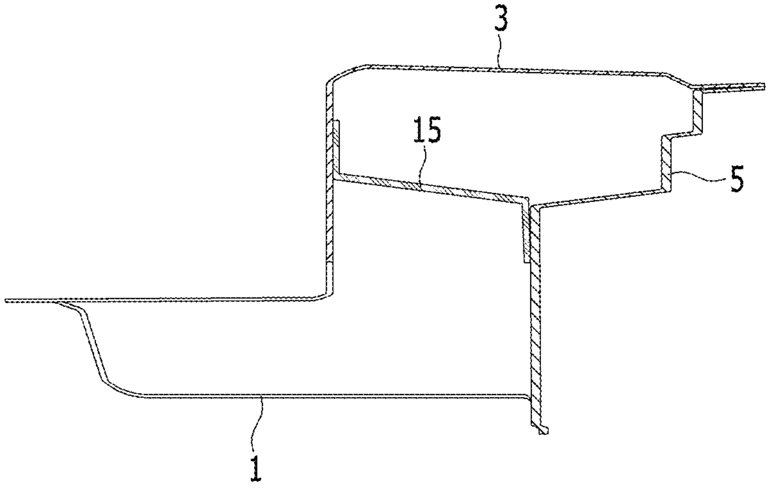

In addition, as shown in FIG. 19, the attachment part(s) and extension part of a variable member 15 may be bent to form an inclination.

Figure 20:
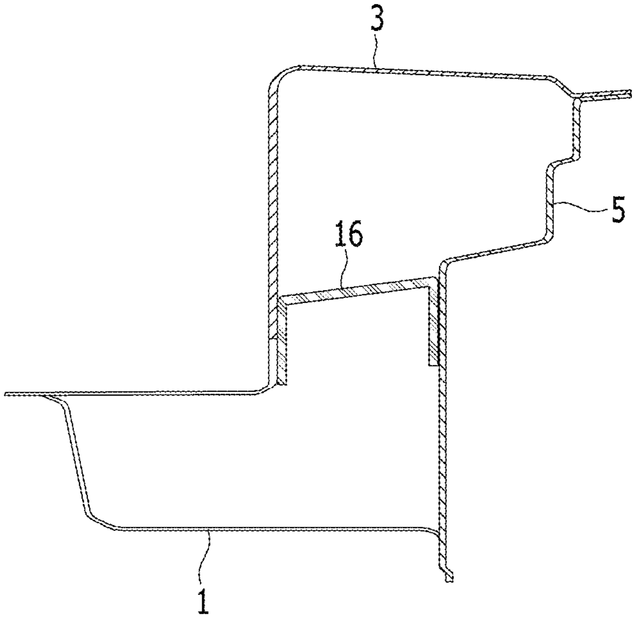

In addition, as shown in FIG. 20, a pair of attachment parts of a variable member 16 may extend in the same direction along the height of the vehicle body 1, and extend downward in relation to the vehicle body 1.

Figure 21:
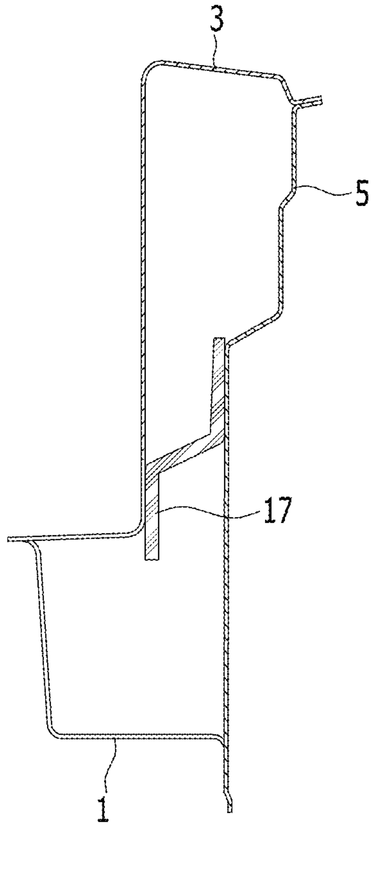

In addition, as shown in FIG. 21, a pair of attachment parts of a variable member 17 may extend in opposite directions along the height of the vehicle body 1. The pair of attachment parts may extend downward in relation to the vehicle body 1 based on, or with respect to, the rear transverse member 3, and extend upward in relation to the vehicle body 1 based on, or with respect to, the back panel 5.

Figure 22:
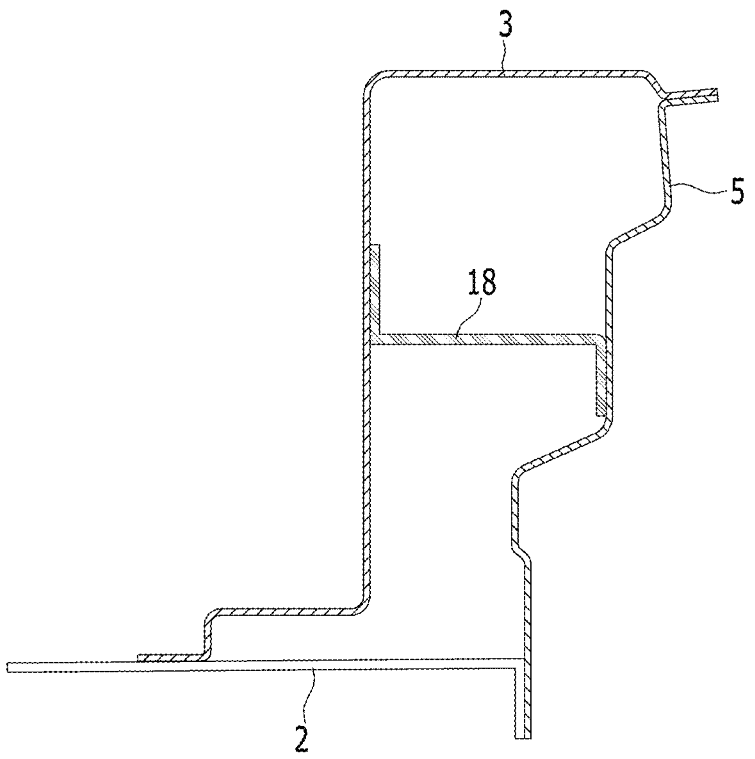
FIGS. 22 and 23 are views each showing an installation example of the variable member of the back panel assembly structure according to an embodiment of the present disclosure in a structure without a rear cross member of a vehicle body.
Figure 23:
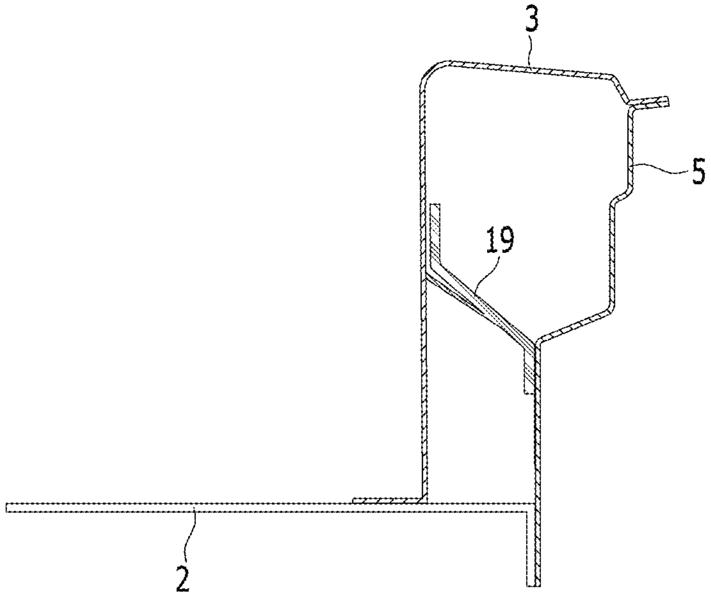

FIGS. 22 and 23 are views each showing an installation example of the variable member of the back panel assembly structure according to an embodiment of the present disclosure in a structure without a rear cross member of the vehicle body.

As shown in FIG. 22, in a structure without the rear cross member of the vehicle body 1, a variable member 18 may be vertically bent, the rear floor panel 2 may extend in the direction horizontal to the vehicle body 1, the rear transverse member 3 may have one end attached to an upper surface of the rear floor panel 2, and the inner surface of the back panel 5 may be directly welded to the end of the rear floor panel 2.

As shown in FIG. 23, in a structure without the rear cross member of the vehicle body 1, a variable member 19 may be obliquely bent, the rear floor panel 2 may extend in the direction horizontal to the vehicle body 1, the rear transverse member 3 may have one end attached to the upper surface of the rear floor panel 2, and the inner surface of the back panel 5 may be directly welded to the end of the rear floor panel 2.

As set forth above, the back panel assembly of a vehicle according to an embodiment of the present disclosure may be advantageous for coping with a low floor and the scalability to the PBV by including the center surface of the rear floor panel that is formed (i.e., protrudes or extends) downward.

In addition, the back panel assembly may meet the rear collision regulation and bumper test regulation standards by improving its strength in such a way that the variable member is added between the rear transverse member and the back panel to thus form the two-box (i.e., two space) back cross section structure, and the vehicle side part and the variable member are connected to each other by the side bulkhead.

In addition, the back panel assembly may be easily and flexibly used in the various vehicle models by changing the position and numbers of the variable members to be used based on the vehicle size and shape.

In addition, the back panel assembly may secure the additional strength at the narrow part of the side cross section by connecting the variable member and the center bulkhead to each other.

Although the embodiments of the present disclosure have been described hereinabove, the scope of the present disclosure is not limited thereto, and all equivalent modifications easily modified by those having ordinary skill in the art to which the present disclosure pertains are intended to fall within the scope and spirit of the present disclosure.

DESCRIPTION OF SYMBOLS

- 1: vehicle body
- 2: rear floor panel
- 3: rear transverse member
- 4: rear floor lower member
- 5: back panel
- 10, 11, 13, 15, 16, 17, 18, 19: variable member
- 12: variable member connection center bulkhead
- 14: side bulkhead

What is claimed is:

1. A back panel assembly, which forms a lower part of a tailgate opening at a rear side of a vehicle body, the assembly comprising:

a rear floor lower member having one end attached to a rear floor panel disposed at the rear side of the vehicle body, and extending in a transverse direction of the vehicle body;

a rear transverse member having one end coupled to an end of the rear floor lower member, and extending in the transverse direction of the vehicle body;

a back panel covering the rear side of the vehicle body by extending in the transverse direction of the vehicle body while connecting other ends of the rear floor lower member and the other end of the rear transverse member to each other; and a variable member extending in the transverse direction of the vehicle body while connecting the rear transverse member and the back panel to each other to thus divide a space, formed by the rear floor lower member, the rear transverse member, and the back panel, into two spaces.

2. The assembly of claim 1, wherein the rear floor panel extends in a direction horizontal to the vehicle body, and the one end of the rear floor lower member and the one end of the rear transverse member are coupled to an end of the rear floor panel.

3. The assembly of claim 2, wherein a side surface of the variable member and a side surface of the rear transverse member are connected to each other by a variable member connection center bulkhead.

4. The assembly of claim 3, wherein a side surface of the variable member connection center bulkhead is welded to the side surface of the variable member and the side surface of the rear transverse member.

5. The assembly of claim 4, wherein a side surface of the rear transverse member and a side surface of the rear floor lower member are connected to each other by a side bulkhead.

6. The assembly of claim 2, wherein the front of a center part of the variable member is spot-welded to a surface of the rear transverse member in the transverse direction of the vehicle body.

7. The assembly of claim 2, wherein the rear of a center part of the variable member is spot-welded to an inner surface of the back panel in the transverse direction of the vehicle body.

8. The assembly of claim 1, wherein a position and quantity of the variable member are changed based on the specifications and shapes of the rear transverse member and the back panel.

9. The assembly of claim 8, wherein the variable member includes:

an attachment part attached to the rear transverse member and the back panel; and an extension part bent and extending from the attachment part.

* * * * *